US012616103B2

(12) United States Patent
Cui et al.

(10) Patent No.: US 12,616,103 B2
(45) Date of Patent: May 5, 2026

(54) AUTOMATIC SEEDLING TAKING AND SEPARATION SYSTEM FOR SUBSTRATE BLOCK SEEDLINGS

(71) Applicant: Nanjing Institute of Agricultural Mechanization, Ministry of Agriculture and Rural Affairs, Nanjing (CN)

(72) Inventors: Zhichao Cui, Nanjing (CN); Chunsong Guan, Nanjing (CN); Yongsheng Chen, Nanjing (CN); Yating Yang, Nanjing (CN); Binxing Xu, Nanjing (CN)

(73) Assignee: Nanjing Institute of Agricultural Mechanization, Ministry of Agriculture and Rural Affairs, Nanjing (CN)

( * ) Notice: Subject to any disclaimer, the term of this patent is extended or adjusted under 35 U.S.C. 154(b) by 406 days.

(21) Appl. No.: 18/448,994

(22) Filed: Aug. 14, 2023

(65) Prior Publication Data

US 2023/0389482 A1 Dec. 7, 2023

(30) Foreign Application Priority Data

Oct. 25, 2022 (CN) .......................... 202211310026.7

(51) Int. Cl.
   *A01G 9/029* (2018.01)
   *A01C 11/02* (2006.01)
(52) U.S. Cl.
   CPC .......... *A01G 9/0299* (2018.02); *A01C 11/025* (2013.01)

(58) Field of Classification Search
   CPC ..... A01G 9/0299; A01C 11/006; A01C 11/02; A01C 11/025
   See application file for complete search history.

(56) References Cited

U.S. PATENT DOCUMENTS

| | | | | |
|---|---|---|---|---|
| 4,307,827 A | * | 12/1981 | Turunen | A01C 11/025 |
| | | | | 111/104 |
| 5,068,999 A | * | 12/1991 | Visser | A01G 9/083 |
| | | | | 47/73 |
| 5,353,723 A | * | 10/1994 | Tesch, Jr. | A01C 11/025 |
| | | | | 111/919 |
| 5,596,938 A | * | 1/1997 | Shaw | A01C 11/025 |
| | | | | 111/105 |
| 5,676,072 A | * | 10/1997 | Williames | A01C 11/025 |
| | | | | 414/404 |
| 6,591,766 B2 | * | 7/2003 | Williames | A01C 11/025 |
| | | | | 111/105 |

(Continued)

*Primary Examiner* — Matthew Troutman
(74) *Attorney, Agent, or Firm* — Hemisphere Law, PLLC

(57) ABSTRACT

The automatic seedling taking and separation system includes a seedling taking device, a seedling delivery device, and two seedling separation devices; the seedling taking device conveys substrate block seedlings on a seedling tray to the seedling delivery device in rows; the seedling delivery device divides a row of substrate block seedlings into two parts and conveys the substrate block seedlings to the two seedling separation devices; and the seedling separation devices perform single-seedling separation through seedling separation mechanisms. The present disclosure can automatically take and separate vegetable substrate block seedlings, thus improving the working efficiency.

5 Claims, 7 Drawing Sheets

(56)          References Cited

U.S. PATENT DOCUMENTS

| | | | | |
|---|---|---|---|---|
| 7,363,868 | B1 * | 4/2008 | Sena | A01C 11/025 |
| | | | | 111/105 |
| 10,058,024 | B2 * | 8/2018 | Tsutsumi | A01G 9/085 |
| 11,483,964 | B2 * | 11/2022 | Moiddin | A01G 23/04 |
| 2016/0165789 | A1 | 6/2016 | Gervais et al. | |
| 2017/0094893 | A1 | 4/2017 | Rains et al. | |
| 2019/0150375 | A1 | 5/2019 | Miyahara et al. | |

* cited by examiner

AUTOMATIC SEEDLING TAKING AND SEPARATION SYSTEM FOR SUBSTRATE BLOCK SEEDLINGS

TECHNICAL FIELD

The present disclosure relates to an automatic seedling taking and separation system for substrate block seedlings, and belongs to the technical field of agricultural machinery.

BACKGROUND

Automatic seedling taking and separation are inevitable ways to achieve high-speed vegetable transplanting. Transplanting seedlings mainly include plug seedlings, bare seedlings, substrate block seedlings, and the like. Due to a block rule and good standing stability of the substrate block seedlings, lodging after planting can be effectively prevented, and there is no barrier between seedling blocks, which can achieve that an entire row of seedlings can be taken out and improve the seedling taking efficiency. Mechanical transplantation has low requirements for the quality of seedlings, and the ages of seedlings and shapes of plants do not affect the seedling separation effect. Therefore, the substrate block seedlings are an effective seedling cultivation method to ensure the vegetable planting quality, improve the transplantation efficiency, and achieve high-speed transplantation.

An existing automatic transplanting machines are mostly configured for taking and separating plug seedlings. Seedling pot bodies are located in a seedling cultivation tray, and the seedling pot bodies are independently spaced apart. Therefore, seedlings can only be taken out by clamping or ejection. Furthermore, due to the impact of factors such as the shape of a seedling plant and a packing nature of a pot body, phenomena of injury of seedlings, omission to take seedlings, and the like might occur during taking of seedlings. In addition, the seedling cultivation tray has defects such as poor standing stability and poor seedling taking effect, which can also cause the seedlings to be prone to lodging after transplantation.

According to applicant's understandings, at present, vegetable substrate block seedlings are mainly transplanted semi-automatically. Although, the planting process is achieved mechanically, seedling taking and throwing operations still need to be manually completed. It has high labor intensity and low efficiency, and the phenomena of omission to take seedlings and injury of seedlings easily occur, which restrains the popularization and application of the vegetable substrate block seedlings.

SUMMARY

The technical problem to be solved in the present disclosure is to provide an automatic seedling taking and separation system for substrate block seedlings, which can automatically take and separate vegetable substrate block seedlings, thus improving the working efficiency.

In order to solve the above technical problems, the technical solution proposed in the present disclosure is as follows: An automatic seedling taking and separation system for substrate block seedlings includes a seedling taking device, a seedling delivery device, and a seedling separation device, wherein the seedling taking device includes a seedling tray, a first push plate, and a first push rod; the seedling tray is fixed on a stand and is overall rectangular; the first push plate is located above the seedling tray; the first push rod is arranged at one end of the seedling tray; the first push plate is driven by the first push rod to move in a stepped and reciprocating manner along the seedling tray;

the seedling delivery device includes a seedling carrier, a first lead-screw nut mechanism, a second lead-screw nut mechanism, a first scraper blade, and a second scraper blade; both the first lead-screw nut mechanism and the second lead-screw nut mechanism are located above the seedling carrier; the first scraper blade and the second scraper blade are separately driven by the first lead-screw nut mechanism and the second lead-screw nut mechanism to move in a reciprocating manner; a travel of the first scraper blade is from a center of the seedling carrier to one end of the seedling carrier; a travel of the second scraper blade is from the center of the seedling carrier to the other end of the seedling carrier;

the seedling separation device includes a first conveyor belt adapted to an end portion of the seedling carrier, a second conveyor belt parallel to the first conveyor belt, and a plurality of third conveyor belts cooperating with the second conveyor belt; the third conveyor belts are perpendicular to the second conveyor belt; the first conveyor belt and the third conveyor belts are separately arranged on two sides of the second conveyor belt; a single-seedling separation mechanism is arranged at one end, far from the seedling carrier, of the first conveyor belt; the single-seedling separation mechanism is configured for pushing the substrate block seedling located at an end portion of the seedling carrier onto the second conveyor belt; the second conveyor belt intermittently moves to convey the substrate block seedlings to seedling inlets of the third conveyor belts; a second push plate is arranged on one side, close to the first conveyor belt, of the second conveyor belt; the second push plate is driven by a second push rod; the third conveyor belts are inclined; a third conveyor belt is placed lower if the third conveyor belt is farther from the second conveying belt;

the single-seedling separation mechanism is a crank and rocker mechanism composed of a crank, a connecting rod, and a rocker; a hinge point between the connecting rod and the rocker is located in the middle of the connecting rod; a third push plate is arranged at one end, far from the crank, of the connecting rod; and the single-seedling separation mechanism has a seedling pushing working state in which the third push plate does a linear motion and a return working state in which the third push plate does a parabolic motion.

The present disclosure has the beneficial effects below: 1) The present disclosure adopts a method for taking an entire row of seedlings by pushing, and equally dividing the seedlings and conveying the seedlings in two paths, thereby improving the seedling taking and separation efficiency. 2) In the present disclosure, the single-seedling separation mechanism adopts a linear motion trajectory when pushing seedlings, and adopts a parabolic motion trajectory when returning, thereby preventing reverse scraping of seedlings during returning while ensuring the stability and reliability of horizontal pushing of the seedlings. 3) The present disclosure can achieve automatic seedling taking and separation operations through reasonable design and automation methods such as controlling by a programmable logic controller (PLC) program. It not only reduces the labor intensity and improves the working efficiency, but also avoids the phenomena of omission and injury of seedlings. Further beneficial effects of the present disclosure refer to the detailed description section.

BRIEF DESCRIPTION OF THE DRAWINGS

The present disclosure will be further described below in conjunction with the drawings.

NUMERALS IN THE DRAWINGS

1: first push rod; 2: seedling tray; 3: first push plate; 4: substrate block seedling; 5: seedling delivery mechanism; 5-1: first lead-screw nut mechanism; 5-2: first scraper blade; 5-3: second lead-screw nut mechanism; 5-4: second scraper blade; 6-1: seedling carrier; 6-2: first conveyor belt; 6-3: clamping plate; 6-4: end surface baffle plate; 6-5: first seedling stop plate; 7: second push rod; 8: single-seedling separation mechanism; 8-1: motor; 8-2: crank; 8-3: connecting rod; 8-4: rocker; 8-5: return pull rod; 8-6: third push plate; 9: stand; 10: spring; 11: guide rod; 12: second conveyor belt; 13: third conveyor belt; 14: second push plate; 15: third seedling stop plate; 16: hollow; 17: second seedling stop plate; and 18: plugging baffle plate.

DETAILED DESCRIPTION OF THE EMBODIMENTS

Embodiment

Figure 1:
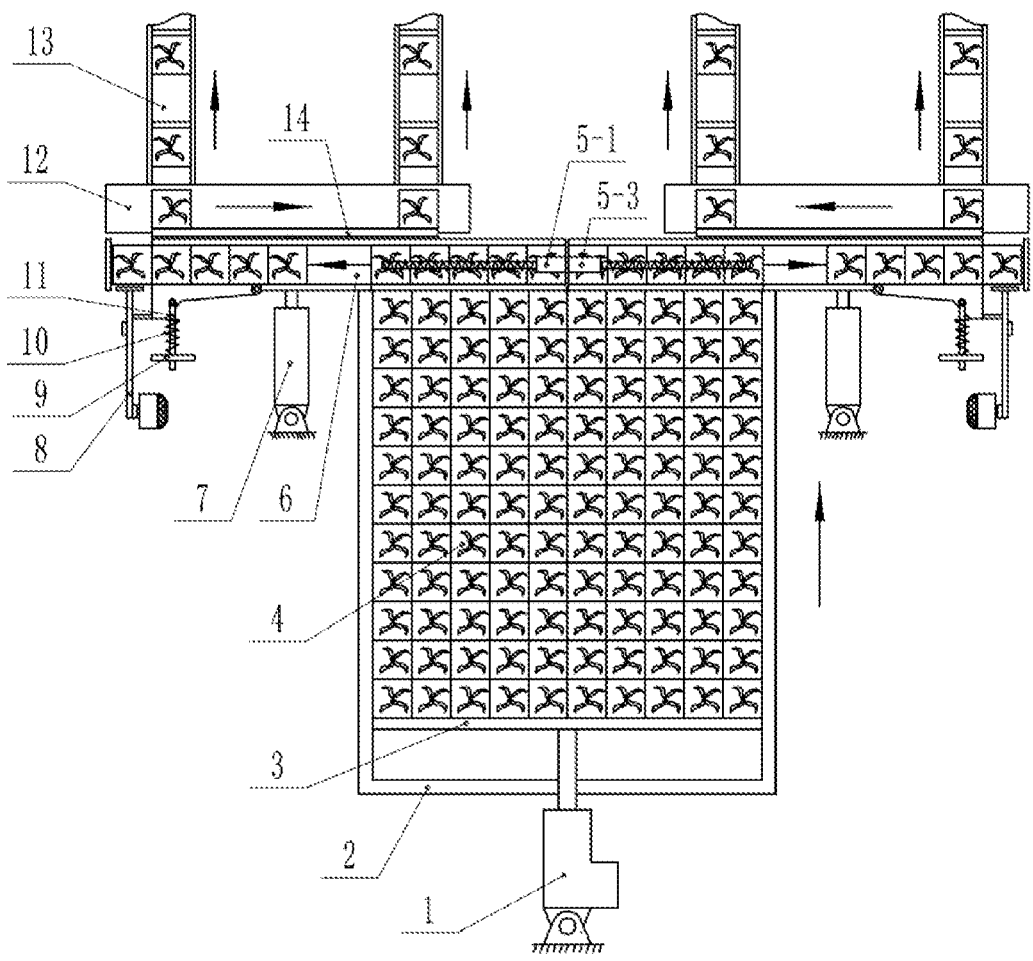
FIG. 1 is a schematic structural diagram of an embodiment of the present disclosure.

This embodiment relates to an automatic seedling taking and separation system for substrate block seedlings, which is configured to automatically take, deliver, and separate vegetable substrate block seedlings. As shown in FIG. 1, the system includes a seedling taking device, a seedling delivery device, and a seedling separation device.

Figure 7:
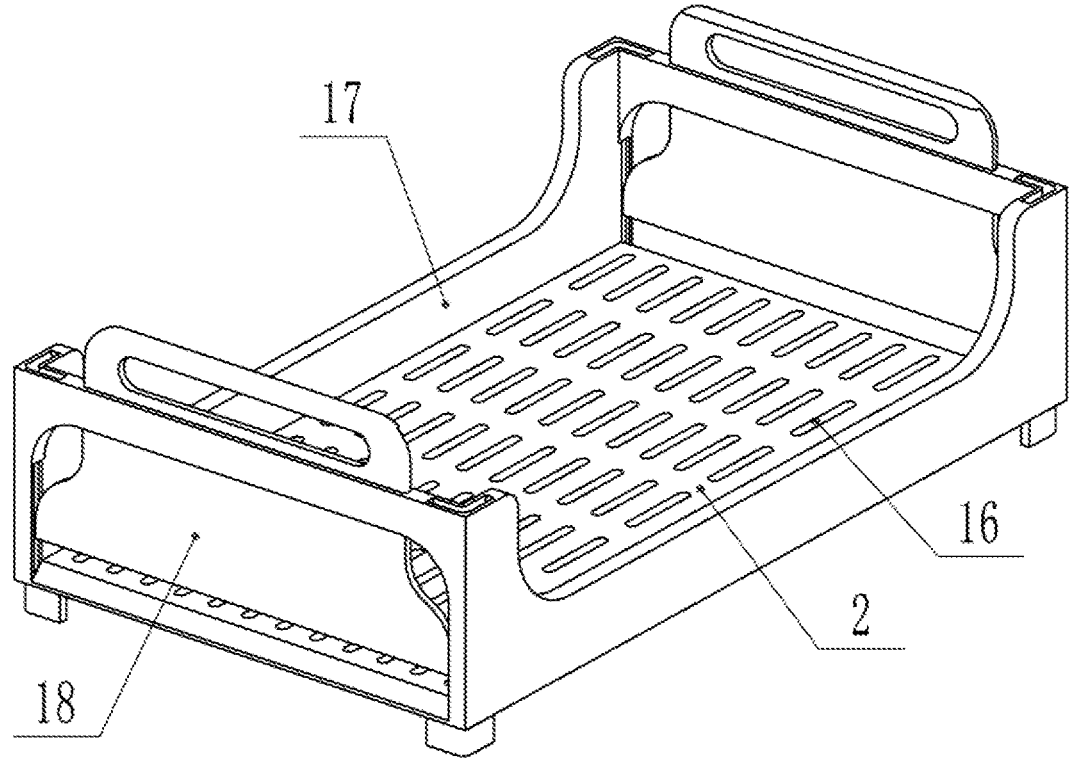
FIG. 7 is a schematic structural diagram of a seedling tray.

As shown in FIG. 1 and FIG. 7, the seedling taking device includes a seedling tray 2, a first push plate 3, and a first push rod 1. The seedling tray 2 is fixed on a stand and is overall rectangular. The first push plate 3 is located above the seedling tray 2. The first push rod 1 is arranged at one end of the seedling tray 2. The first push plate 3 is driven by the first push rod 1 to move in a stepped and reciprocating manner along the seedling tray 2. In this embodiment, the first push rod 1 adopts an electric push rod or a piston rod of an air cylinder or a hydraulic cylinder and drives the first push plate 3 to push an entire row of seedlings to achieve seedling taking. A distance of forwards pushing a row of substrate block seedlings 4 is controlled by using a PLC program.

Preferably, as shown in FIG. 7, second seedling stop plates 17 are separately arranged on left and right sides of the seedling tray 2. Two ends of the first push plate 3 are respectively close to the two second seedling stop plates 17, which can prevent the substrate block seedlings 4 from sliding off. In addition, the seedling tray 2 can also be provided with a plurality of hollows 16, which can reduce the weight and costs and filter out soil scattered from the substrate block seedlings 4. Front and rear ends of the seedling tray 2 can be connected with plugging baffle plates 18 to stop the substrate block seedlings 4 during transportation. The plugging baffle plates 18 can be removed during seedling taking and separation.

Figure 2:
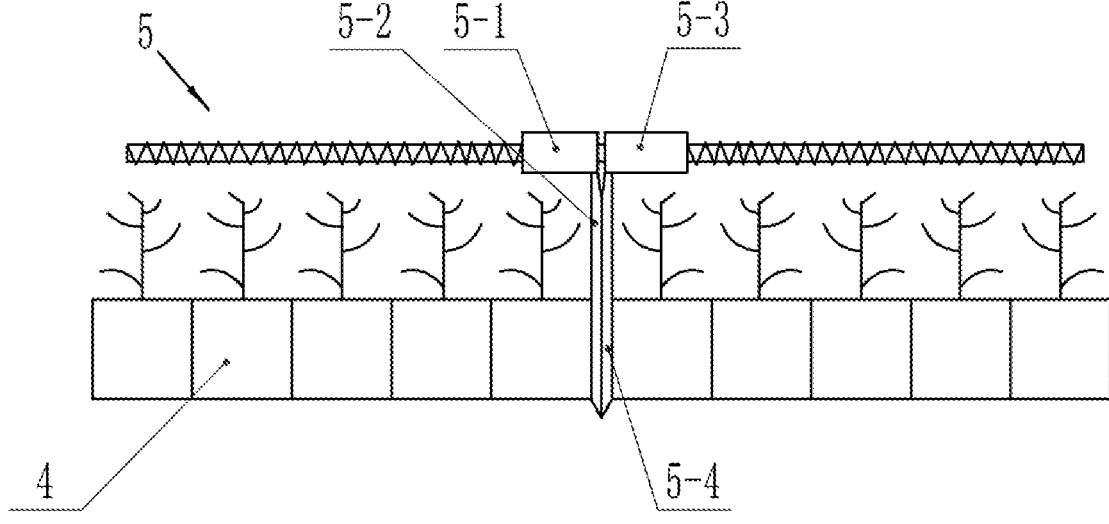
FIG. 2 is a schematic diagram of a seedling delivery device.
Figure 3:
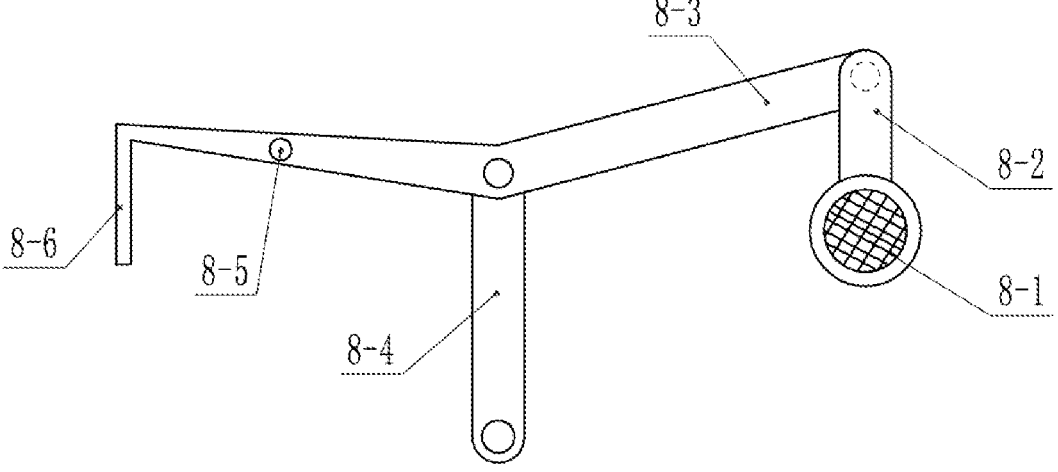
FIG. 3 is a front view of a single-seedling separation mechanism.
Figure 4:
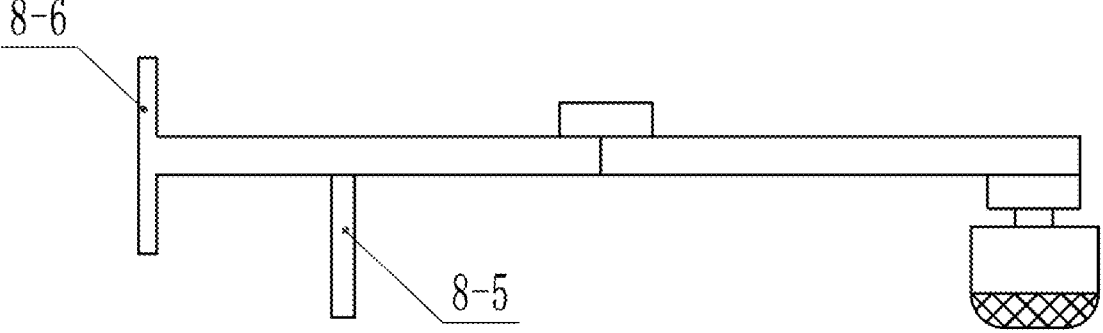
FIG. 4 is a top view of a single-seedling separation mechanism.

As shown in FIG. 1 and FIG. 2, the seedling delivery device includes a seedling carrier 6-1, a first lead-screw nut mechanism 5-1, a second lead-screw nut mechanism 5-3, a first scraper blade 5-2, and a second scraper blade 5-4. Both the first lead-screw nut mechanism 5-1 and the second lead-screw nut mechanism 5-3 are located above the seedling carrier 6-1. The first scraper blade 5-2 and the second scraper blade 5-4 are separately driven by the first lead-screw nut mechanism 5-1 and the second lead-screw nut mechanism 5-3 to move in a reciprocating manner. A travel of the first scraper blade 5-2 is from a center of the seedling carrier 6-1 to one end of the seedling carrier 6-1; and a travel of the second scraper blade 5-4 is from the center of the seedling carrier 6-1 to the other end of the seedling carrier 6-1. That is, the first scraper blade 5-2 and the second scraper blade 5-4 divide the seedling carrier 6-1 into two parts. After the substrate block seedlings 4 are pushed to the seedling carrier 6-1, the first scraper blade 5-2 and the second scraper blade 5-4 evenly separate an entire row of substrate block seedlings 4, and the substrate block seedlings 4 are quickly delivered to the seedling separation devices on two sides under the driving of the first lead-screw nut mechanism 5-1 and the second lead-screw nut mechanism 5-3. That is, the substrate block seedlings 4 on the seedling tray 2 are evenly divided into two paths through the seedling delivery device for seedling delivery and separation, thus improving the efficiency of seedling delivery and separation.

Figure 5:
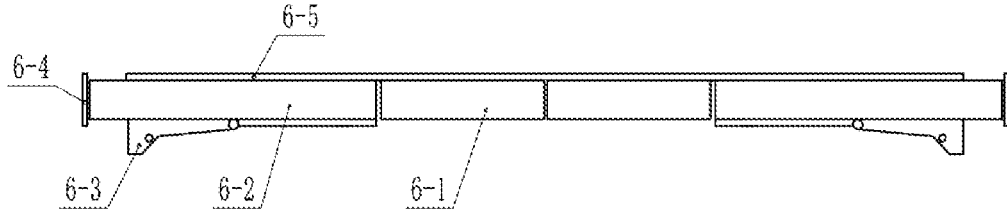
FIG. 5 is a schematic diagram of cooperation between a seedling delivery device and a seedling separation device.
Figure 6:
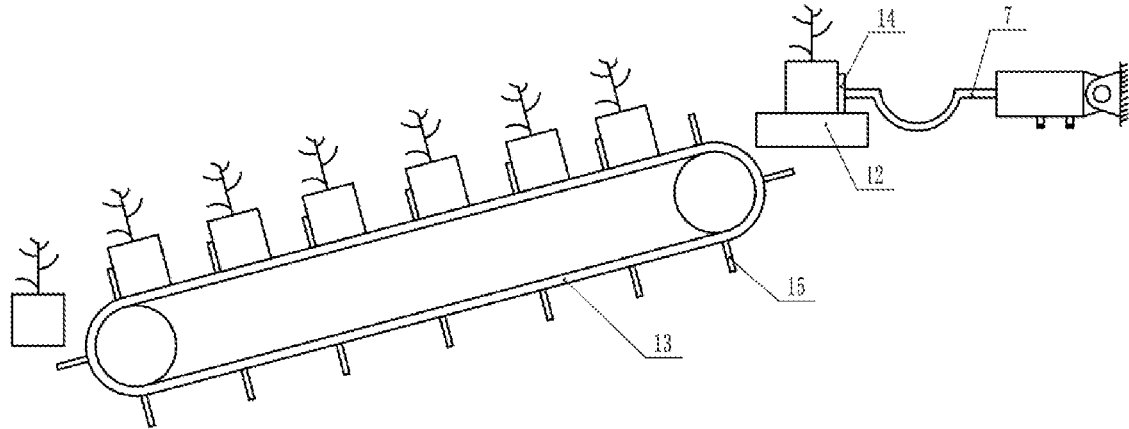
FIG. 6 is a schematic diagram of a seedling separation device.

As shown in FIG. 1, FIG. 5, and FIG. 6, the seedling separation device includes a first conveyor belt 6-2 adapted to an end portion of the seedling carrier 6-1, a second conveyor belt 12 parallel to the first conveyor belt 6-2, and a plurality of third conveyor belts 13 cooperating with the second conveyor belt 12. The third conveyor belts 13 are perpendicular to the second conveyor belt 12. The first conveyor belt 6-2 and the third conveyor belts 13 are separately arranged on two sides of the second conveyor belt 12. A single-seedling separation mechanism 8 is arranged at one end, far from the seedling carrier 6-1, of the first conveyor belt 6-2. The single-seedling separation mechanism 8 is configured for pushing the substrate block seedling 4 located at an end portion of the seedling carrier 6-1 onto the second conveyor belt 12. The single-seedling separation mechanism 8 pushes seedlings according to a certain frequency, so that the substrate block seedlings 4 of the second conveyor belt may be arranged at certain intervals, which forms planting row spacings that correspond to the positions of the third conveyor belts 13. That is, the second conveyor belt 12 intermittently moves to convey the substrate block seedlings 4 to seedling inlets of the third conveying belts 13. A second push plate 14 is arranged on one side, close to the first conveyor belt 6-2, of the second conveyor belt 12. The second push plate 14 is driven by the second push rod 7. The second push rod 7 can adopt an electric push rod or a piston rod of an air cylinder or a hydraulic cylinder. The third conveyor belts 13 are inclined. A third conveyor belt is placed lower if the third conveyor belt is farther from the second conveying belt 12. Tail ends of the third conveyor belts 13 are connected to a planting apparatus or are directly planted into soil. During implementation, as shown in FIG. 1, the substrate block seedlings 4 on the second conveyor belt 12 correspond to conveying slots on the third conveyor belts 13 and are pushed onto the third conveyor belts 13 under the action of the second push rod 7 and the second push plate 14, thereby conveying the substrate block seedlings 4 into the planting apparatus or soil for planting.

Preferably, a plurality of third seedling stop plates 15 perpendicular to the third conveyor belts are arranged on peripheral surfaces of the third conveyor belts 13. A clearance between two adjacent third seedling stop plates 15 is equal. When in use, the seedling separation device mechanism precisely pushes the substrate block seedlings 4 to be between two adjacent third seedling stop plates 15 of the third conveyor belts 13 in sequence. It can not only prevent the substrate block seedlings 4 from slipping during inclined transportation, but also ensure a consistent plant spacing, which is not available in the existing technology.

As shown in FIG. 1, FIG. 3, FIG. 4, and FIG. 5, the single-seedling separation mechanism 8 is a crank and rocker mechanism composed of a crank 8-2, a connecting rod 8-3, and a rocker 8-4. The crank and rocker mechanism is driven by a motor 8-1. A hinge point between the connecting rod 8-3 and the rocker 8-4 is located in the middle of the connecting rod 8-3. A third push plate 8-6 is arranged at one end, far from the crank 8-2, of the connecting rod 8-3. The single-seedling separation mechanism 8 has a seedling pushing working state in which the third push plate 8-6 does a linear motion and a return working state in which the third push plate 8-6 does a parabolic motion. It can prevent reverse scraping of the seedlings during returning and achieve the stability and reliability of horizontal pushing of the seedlings.

It should be emphasized that in this embodiment, the seedling tray 2 is arranged in the middle of the system rather than on one side, which ensures the balance and stability of the system. The structure is reasonable in stress, the space is saved, and the mechanism is compact, so that the impact of the mounting of the seedling tray 2 on one side of the system on a region in which the substrate block seedlings 4 have been transplanted in a forward movement process. In addition, placing the seedling tray 2 in the middle of the system rather than on one side of the system also has the following advantages: 1) The seedling delivery device only takes out one row of seedlings from the seedling tray, and the seedlings can be evenly divided into two paths to achieve seedling delivery and subsequent seedling separation. There is no need to continuously take multiple rows of substrate block seedlings at one time. After the substrate block seedlings correspond to respective planting rows, the seedlings are then separated and planted. Therefore, in this embodiment, all planting rows and row spacings are adjusted flexibly. 2) The seedling tray is arranged in the middle of the system. The substrate block seedlings can be evenly divided into two paths immediately after one row of substrate block seedlings are taken at one time. Therefore, travels of seedling taking, seedling delivery, and seedling separation are short, which contributes to improving the efficiency.

In this embodiment, a conveying rhythm of the first conveyor belt 6-2 can be controlled through a PLC to cooperate with the single-seedling separation mechanism 8. However, the applicant finds in practice that there may be a deviation in positions of the substrate block seedlings 4 on the first conveyor belt 6-2. Therefore, the substrate block seedlings cannot perfectly cooperate with the single-seedling separation mechanism 8, causing omission of seedlings and the like. Although the above problem can be solved by reducing the operating efficiency of the single-seedling separation mechanism 8, the working efficiency can be reduced. Therefore, this embodiment has the following improvement.

As shown in FIG. 1 and FIG. 5, the first conveyor belt 6-2 is in a continuous conveying state. First seedling stop plates 6-5 are separately arranged on two sides of the first conveyor belt 6-2. An end surface baffle plate 6-4 is arranged at an end portion, far from the seedling carrier 6-1, of the first conveyor belt 6-2. A clamping plate 6-3 is arranged on one side, far from the second conveyor belt 12, of the first conveyor belt 6-2.

The clamping plate 6-3 is hinged with the stand. The stand 9 is further provided with a guide hole and a guide rod 11 penetrating through the guide hole. One end of the guide rod 11 is hinged with the clamping plate 6-3, and the guide rod 11 is sleeved with a spring 10. The spring 10 is located between the clamping plate 6-3 and the guide hole.

The connecting rod 8-3 of the single-seedling separation mechanism 8 is fixedly connected with a return pull rod 8-5. When the single-seedling separation mechanism 8 is in the seedling pushing working state, the return pull rod 8-5 does not contact the clamping plate 6-3. When the single-seedling separation mechanism 8 is in the return working state, the return pull rod 8-5 drives the clamping plate 6-3 to move away from the second conveyor belt 12.

In the seedling pushing working state, the clamping plate 6-3 clamps the subsequent substrate block seedlings 4 under the action of the spring 10 and the action of the guide rod 11 to pause the transportation of the substrate block seedlings. When the push rod 8-3 completes seedling pushing and returns, the return pull rod 8-5 pulls back the clamping plate 6-3 to release the substrate block seedlings 4, so that the subsequent substrate block seedlings 4 fill the position.

What is claimed is:

1. An automatic seedling taking and separation system for substrate block seedlings, comprising a seedling taking device, a seedling delivery device, and a seedling separation device, wherein the seedling taking device comprises a seedling tray, a first push plate, and a first push rod; the seedling tray is fixed on a stand; the first push plate is located above the seedling tray; the first push rod is arranged at one end of the seedling tray; the first push plate is driven by the first push rod to move in a stepped and reciprocating manner along the seedling tray;

the seedling delivery device comprises a seedling carrier, a first lead-screw nut mechanism, a second lead-screw nut mechanism, a first scraper blade, and a second scraper blade; both the first lead-screw nut mechanism and the second lead-screw nut mechanism are located above the seedling carrier; the first scraper blade and the second scraper blade are separately driven by the first lead-screw nut mechanism and the second lead-screw nut mechanism to move in a reciprocating manner; a travel of the first scraper blade is from a center of the seedling carrier to one end of the seedling carrier; a travel of the second scraper blade is from the center of the seedling carrier to the other end of the seedling carrier;

the seedling separation device comprises a first conveyor belt adapted to an end portion of the seedling carrier, a second conveyor belt parallel to the first conveyor belt, and a plurally of third conveyor belts cooperating with the second conveyor belt; the third conveyor belts are perpendicular to the second conveyor belt; the first conveyor belt and the third conveyor belts are separately arranged on two sides of the second conveyor belt; a single-seedling separation mechanism is arranged at one end, of the first conveyor belt; the single-seedling separation mechanism is configured for pushing the substrate block seedling located at an end portion of the seedling carrier onto the second conveyor belt; the second conveyor belt intermittently moves to convey the substrate block seedlings to seedling inlets of the third conveyor belts; a second push plate is arranged on one side, of the second conveyor belt; the second push plate is driven by a second push rod; the third conveyor belts are inclined;

the single-seedling separation mechanism is a crank and rocker mechanism composed of a crank, a connecting rod, and a rocker; a hinge point between the connecting rod and the rocker is located in the middle of the connecting rod; a third push plate is arranged at one end of the connecting rod; and the single-seedling separation mechanism has a seedling pushing working state in which the third push plate does a linear motion and a return working state in which the third push plate does a parabolic motion.

2. The automatic seedling taking and separation system for the substrate block seedlings according to claim 1, wherein first seedling stop plates are respectively arranged on two sides of the first conveyor belt; an end surface baffle plate is arranged at an end portion of the first conveyor belt; a clamping plate is arranged on one side, far from the second conveyor belt, of the first conveyor belt;

the clamping plate is hinged with the stand; the stand is further provided with a guide hole and a guide rod penetrating through the guide hole; one end of the guide rod is hinged with the clamping plate, and the guide rod is sleeved with a spring; the spring is located between the clamping plate and the guide hole;

the connecting rod of the single-seedling separation mechanism is fixedly connected with a return pull rod; when the single-seedling separation mechanism is in the seedling pushing working state, the return pull rod does not contact the clamping plate; and when the single-seedling separation mechanism is in the return working state, the return pull rod drives the clamping plate to move away from the second conveyor belt.

3. The automatic seedling taking and separation for the substrate block seedlings according to claim 1, wherein a plurality of third seedling stop plates perpendicular to the third conveyor belts are arranged on peripheral surfaces of the third conveyor belts; a clearance between two adjacent third seedling stop plates is equal; and when in use, the seedling separation device mechanism precisely pushes the substrate block seedlings to be between two adjacent third seedling stop plates of the third conveyor belts in sequence.

4. The automatic seedling taking and separation system for the substrate block seedlings according to claim 1, wherein second seedling stop plates are respectively arranged on two sides of the seedling tray.

5. The automatic seedling taking and separation system for the substrate block seedlings according to claim 1, wherein the seedling tray is provided with a plurality of hollows.

* * * * *